United States Patent
Dybro et al.

(10) Patent No.: US 10,034,423 B2
(45) Date of Patent: Jul. 31, 2018

(54) BIOMASS SENSING

(71) Applicant: Deere and Company, Moline, IL (US)

(72) Inventors: Niels Dybro, Sherrard, IL (US); Aaron J. Bruns, Bettendorf, IA (US)

(73) Assignee: Deere & Company, Moline, IL (US)

( * ) Notice: Subject to any disclaimer, the term of this patent is extended or adjusted under 35 U.S.C. 154(b) by 660 days.

(21) Appl. No.: 14/446,264

(22) Filed: Jul. 29, 2014

(65) Prior Publication Data
US 2016/0029558 A1    Feb. 4, 2016

(51) Int. Cl.
*A01D 41/127*    (2006.01)
*A01D 41/06*    (2006.01)
*A01B 79/00*    (2006.01)

(52) U.S. Cl.
CPC .......... *A01D 41/127* (2013.01); *A01B 79/005* (2013.01); *A01D 41/06* (2013.01); *A01D 41/1271* (2013.01)

(58) Field of Classification Search
CPC ............. A01D 41/1271; A01D 41/127; G01N 2021/8466; G01N 33/0098; A01B 79/005
USPC ............................................ 56/10.2 B; 460/7
See application file for complete search history.

(56) References Cited

U.S. PATENT DOCUMENTS

| | | | |
|---|---|---|---|
| 6,839,616 B2* | 1/2005 | Beck ................. | A01D 41/1271 56/10.2 R |
| 7,169,040 B2* | 1/2007 | Kormann ............. | G01N 21/359 250/339.11 |
| 7,311,013 B1* | 12/2007 | Hoskinson ........... | A01D 41/127 56/10.2 E |
| 7,487,024 B2* | 2/2009 | Farley ................ | A01D 41/1243 701/50 |
| 9,322,629 B2* | 4/2016 | Sauder ................ | A01D 45/021 |
| 9,485,905 B2* | 11/2016 | Jung ................... | A01D 41/127 |
| 9,664,631 B2* | 5/2017 | Delie .................. | G01N 33/025 |
| 2014/0129146 A1* | 5/2014 | Romier ............... | A01B 79/005 702/5 |
| 2014/0236381 A1* | 8/2014 | Anderson ............. | A01D 75/00 701/1 |
| 2014/0277961 A1* | 9/2014 | Blank ................. | A01D 41/127 701/50 |
| 2015/0038201 A1* | 2/2015 | Brinkmann ........... | A01F 12/40 460/112 |
| 2015/0245560 A1* | 9/2015 | Middelberg ......... | A01D 41/1277 460/7 |
| 2015/0293029 A1 | 10/2015 | Acheson et al. | |
| 2015/0305238 A1* | 10/2015 | Klausmann ........... | A01D 75/00 701/50 |
| 2016/0003656 A1* | 1/2016 | Gelinske .............. | G01F 1/666 73/861.18 |
| 2016/0011024 A1* | 1/2016 | Kirk ................... | G01F 1/30 73/861.73 |
| 2016/0198628 A1* | 7/2016 | Byttebier ............. | A01F 29/10 56/10.2 B |
| 2016/0366821 A1* | 12/2016 | Good .................. | A01D 41/1271 |

* cited by examiner

*Primary Examiner* — John Weiss
(74) *Attorney, Agent, or Firm* — Rathe Lindenbaum LLP (57) ABSTRACT

A harvester interacts with plants so as to separate a harvested portion from a biomass portion of each of the plants. At least one sensor carried by the harvester outputs a signal based upon an attribute of the biomass portion.

21 Claims, 6 Drawing Sheets

BIOMASS SENSING

BACKGROUND

During harvesting, the harvested portion is separated from the associated biomass portion. Attributes of the harvested portion are sometimes sensed and recorded.

DETAILED DESCRIPTION OF EXAMPLES

Figure 1:
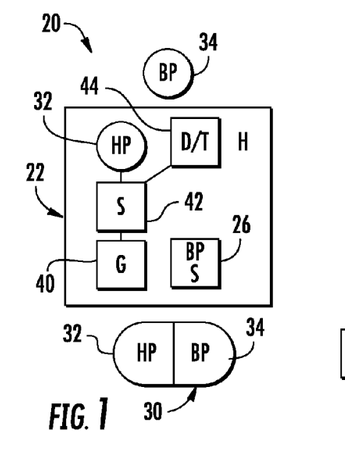
FIG. 1 is a schematic diagram of an example biomass sensing system.

FIG. 1 schematically illustrates an example biomass sensing system 20. As will be described hereafter, biomass sensing system 20 obtains information regarding attributes of the biomass of plants during the harvest of harvested portions of the plants. Such information assists in field and crop management.

Biomass sensing system 20 comprises harvester 22 and biomass portion sensor 26. Harvester 22 comprises a device configured to gather plants 30 and separate a harvested portion 32 from the remaining biomass portion 34 of each of the plants 30. According to one example, the phrase "configured to" denotes an actual state of configuration that fundamentally ties the stated function/use to the physical characteristics of the feature proceeding the phrase "configured to". In one implementation, the harvested portion 32 comprises a grain while the biomass portion 34 comprises the rest of the plant, such as a stalk, foliage and the like. Examples of such plants include, but are not limited to, corn, soybeans and the like. In another implementation, the harvested portion comprises a selected portion of the plant, such as a stalk of the plant, while the biomass portion comprises the remainder of the plant. Examples of such plants include, but are not limited to, sugarcane. In another implementation, the harvested portion comprises a fruit or above ground vegetable of the plant while the biomass portion comprises the remainder of the plant. Examples of such plants include, but are not limited to, tomatoes. In yet another implementation, harvested portion comprises a subterranean portion of the plant, such as a root or tuber while the biomass portion comprises the remainder of the plant. Examples of such plants include, but are not limited to, carrots, turnips and potatoes.

In the example illustrated, harvester 22 comprises plant gathering components 40, separating components 42 and discharge/treatment components 44. Plant gathering components 40 comprise components configured to gather, direct, guide or channel plants to separation components 40. In one implementation, plant gathering components 40 sever a portion of the plant, including both harvested portion 32 and biomass portion 34, from the ground. In another implementation, gathering components 40 uproot the plant from the ground. Examples of various plant gathering components of harvester 22 include, but are not limited to, cutter bars, stalk rolls, rotating tines, augers, gathering chains and the like.

Separation components 40 comprise components configured to separate harvested portion 32 from the remaining biomass portion 34. Examples of separation components 40 include, but are not limited to, stripper plates, harvester threshing drums and concaves, straw walkers, sieves, grain return or tailing systems, beaters and other threshing mechanisms. In one implementation, the harvested portion may be the grain itself. In another implementation, harvested portion may be the grain and associated shell or cob which has been separated from the remaining biomass portion 34 of the plant 30.

In one implementation, harvester 22 collects and stores the separated and harvested portion 32 while discharging the remaining biomass portion 34. In one implementation, harvester 22 comprises a vehicle which traverses a field, wherein the vehicle includes a storage tank or bin in which the harvested portion is temporarily stored. In yet other implementations, the harvested portion 32, after being separated from biomass portion 34, is discharged to an independent or separate storage vehicle, such as a wagon or tank of another vehicle traveling alongside the harvester 22. In other implementations, harvested portion 32, after being separated from biomass portion 34, is discharged or released to the field for subsequent collection and storage.

Discharge components 44 comprise components of harvester 22 that are configured to expel the separated biomass portions 34 from harvester 22. For example, in one implementation, harvester 22 comprises a vehicle to traverse a field, wherein discharged opponents 44 discharge the remaining biomass portion out a rear of the vehicle as it crosses the field. In one implementation, discharge components 44 additionally treat the remaining biomass portion either before or immediately after discharge of the remaining biomass portion. For example, in one implementation, discharge components 44 perform additional cutting, chopping or severing operations upon the remaining biomass portion after the biomass portion has been separated from the harvested portion. In one implementation, harvester 22 applies one or more chemicals to the remaining biomass portion either before or immediately after the biomass portion has been discharged. For example, in one implementation, harvester 22 applies chemicals to assist in biodegradation of the remaining biomass portion either before or after discharge back to the field.

Biomass portion sensor 26 comprises one or more sensors configured to output signals which indicate one or more attributes of biomass portion 34. In one implementation, such signals directly indicate the one or more attributes of biomass portion 34. In another implementation, such signals indirectly indicate the one or more attributes of biomass portion 34, such as when combined with other data or other signals. In one implementation, system 20 consults a historical look up table or one or more mathematical formulas or algorithms to determine the one or more attributes of biomass portion 34 using the signals from sensor 26 as an input.

In one implementation, the one or more biomass portion sensors 26 output signals indicating a moisture content of the biomass portion 34. In one implementation, the one or more biomass portion sensors 26 output signals indicating a quantity or mass of biomass portion 34 interacted upon by harvester 22. In one implementation, the one or more biomass portion sensor 26 output signals indicating a purity or content of biomass portion 34. For example, in some circumstances, biomass portion 34 associated with plants 32 may be co-mingled or mixed with other biomass materials such as weeds and the like. In such an implementation, biomass portion sensor 26 is configured to indicate what percentage or mass is associated with biomass portion 34 from plants 32 and what percentage or mass associated with foreign or extraneous biomass materials. In still other implementations, other attributes are determined from the signals output by biomass portion sensor 26.

In one implementation, biomass portion sensor 26 senses one of more attributes of biomass portion 34 that is severed, collected and otherwise passes through harvester 22. In another implementation, biomass portion sensor 26 senses one or more attributes of biomass portion 34 associated with plants 32, regardless of whether the biomass portion 34 passes through harvester 22 or remains rooted in the ground after harvested portion 32 has been collected by harvester 22. For example, in one implementation, biomass portion sensor 26 output signals which indicate one or more attributes of a portion of the stalk and leafage of plant 30 that is been severed and that is passing through harvester 22 and/or one or more attributes of a remainder of the stalk that remains rooted in the ground after such severing. In one implementation, the attributes of the remainder of the plant 30 that remains rooted in the ground after such severing is determined based upon signals resulting from biomass portion sensor 26 interacting with the portion of plant 30 that has been severed and that is passing through harvester 22.

In one implementation, biomass portion sensor 26 comprises one or more acoustic sensors, wherein sensor 26 outputs signals based upon the sound or acoustic pressure resulting from interaction of plant 30 with harvester 22. For example, in one implementation, sensor 26 outputs signals based upon the sound resulting from plant 30 being impacted upon or striking a surface of harvester 22. For example, in one implementation, sensor 26 senses the sound of the harvested portion 32 impacting a surface of harvester 22.

In one implementation in which harvester 22 comprises a combine for harvesting corn, sensor 26 senses the impact of an ear of corn impacting stripper plates or other portions of the harvesting head of harvester 22. In another implementation, sensor 26 senses the sound of biomass portion 34 impacting a surface of harvester 22. In one implementation in which harvester 22 comprises a combine harvesting corn, sensor 26 senses the sound produced by the corn plant being severed or the sound produced by bending of the corn stalk. Such sounds or crackling correspond to one or more attributes of biomass portion 34, such as the moisture content, quantity and/or purity of biomass portion 34.

In one example implementation of a corn header for harvesting corn, biomass portion sensor 26 comprises one or more acoustic sensors mounted or supported high on a rearward facing "ear saver" surface on each of snouts of the corn head with each sensor oriented such that it is focused towards an ear impact zone on the stripper plates. In another example implementation of a combine header for harvesting corn, biomass portion 26 comprises one or more acoustic sensors mounted under a rear half of the snouts so as to sense or pick up the sound of the thud from an ear of corn hitting the snout. In yet another implementation of a corn header for harvesting corn, biomass portion sensor 26 comprises one or more acoustic sensors mounted alongside the stalk rolls or rollers so as to sense the sound produced by interaction of the stalk rolls with the stalk, wherein the noise or acoustic pressure from the crackling is attributed to the relative moisture content or other attributes of biomass portion 34.

In another implementation, biomass portion sensor 26 comprises one or more capacitive sensors. As portions of plant 30, such as harvested portion 32 or biomass portion 34, interact with or pass the surface, the capacitive sensor serving as biomass portion sensor 26 experiences or undergoes a change in capacitance. Signals indicating the change in capacitance further indicate one or more attributes of harvested portion 32 and/or biomass portion 34. In one implementation, such capacitive sensors detect the passing of dielectric material, wherein the more ion containing moisture in the material passing the capacitive sensor, the greater the signal output by the sensor. In one implementation, the capacitive sensor may comprise a grid to facilitate the detection of quantity or other attributes of biomass portion 34.

In one implementation, biomass portion sensor 26 comprises a capacitive sensor located below a surface of harvester 22 that interacts with plant 30. In one implementation in which harvester 22 comprises a corn head, biomass portion sensor 26 comprises one or more capacitive sensors that are coated or painted onto an underside or inside of a snout, protecting the one or more biomass portion sensors 26 from direct exposure to where from the crop or plant 30 being processed or harvested. In yet other implementations, biomass portion sensor 26 comprises one or more capacitive sensors that are laminated, bonded, adhered or otherwise secured to an underside inside of the snout or are mounted to other locations of the harvester head or at other locations downstream of the harvester head.

In yet another implementation, biomass portion sensor 26 comprises a deflection sensor or force sensor which detects deflection of one or more surfaces of harvester 22 as a result of interaction with plant 30 or biomass portion 34. For example, in one implementation in which harvester 22 comprises a corn head for harvesting corn, biomass portion sensor 26 comprises a deflection sensor to sense deflection or movement of stripper plates and/or stalk rollers of the head. Signals from the one or more deflection sensors indicate stalk thickness, which indicates a quantity or mass of biomass portion 34, and/or indicates a moisture content or purity content.

Figure 2:
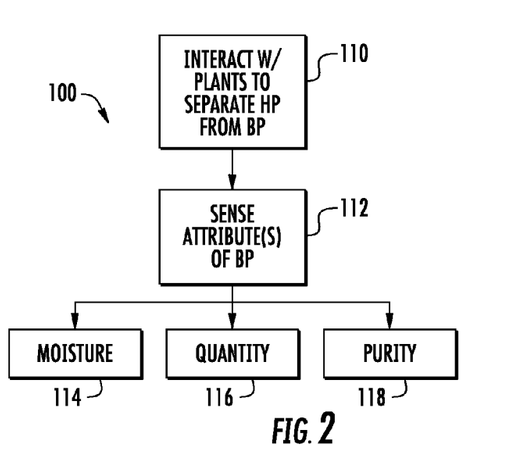
FIG. 2 is a flow diagram of an example method for determining biomass attributes.

FIG. 2 is a flow diagram of an example method 100 that may be carried out or implemented to detect one or more attributes of biomass portion 34. As indicated by block 110, harvester 22 interacts with plants 32 to separate harvested portion 32 from biomass portion 34. In one implementation, the separated harvested portion 32 is gathered or collected in a tank of harvester 22. In another implementation, the separated harvested portion 32 is discharged from harvester 22 into a tank of another vehicle traveling with harvester 22 across a field or is discharged onto the ground for subsequent collection.

As indicated by block 112, biomass portion sensor 26 senses one or more attributes of biomass portion 34. In one implementation, such sensing is carried out using one or more acoustic sensors sensing interaction of plant 30 with harvester 22. In another implementation, such sensing is carried out using one or more capacitive sensors carried by harvester 22. In yet another implementation, such sensing is carried out using one or more force or deflection sensors. In yet other implementations, such sensing is carried out using multiple sensors of distinct types, such as combinations of acoustic, capacitive and/or force-deflection sensors.

As indicated by blocks 114, 116 and 118, signals output by biomass portion sensors 26 are analyzed to determine one or more attributes of biomass portion 34 such as moisture, quantity, and purity, respectively. In one implementation, one or more processing units carry out such analysis on board harvester 22. In another implementation, one or more processing units remote from harvester 22 receive the signals and carry out the analysis to determine the one of more attributes of biomass portion 34. The attributes of biomass portion 34, once determined, may be output for storage, viewing and/or adjustment to the operation of harvester 22 or other subsequent field management operations.

Figure 3:
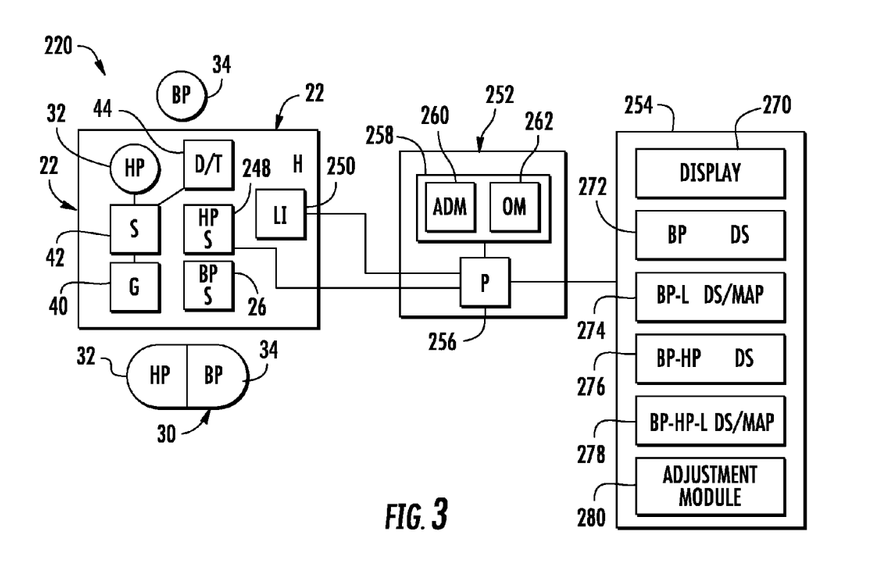
FIG. 3 is a schematic diagram of another example biomass sensing system.

FIG. 3 schematically illustrates biomass sensing system 220, an example implementation of biomass sensing system 20. Biomass sensing system 220 is similar to biomass sensing system 20 except that biomass sensing system 220 is specifically illustrated as additionally comprising harvested portion sensor 248, localization or location indicator 250, controller 252 and output 254. Those remaining components of biomass sensing system 220 which correspond to components of biomass sensing system 20 are numbered similarly in FIG. 3 or are shown in FIG. 1.

Harvested portion sensor 248 comprises one or more sensors configured to output signals indicating, directly or indirectly, one or more attributes of harvested portion 32 of plant 30. In one implementation, harvested portion sensor 248 outputs signals indicating a quantity, such as mass or volume, of harvested portion 32 collected or separated by harvester 22. In one implementation, harvested portion sensor 248 comprises one or more of the same sensors serving as biomass portion sensor 26. In another implementation, harvested portion sensor 248 comprises sensors in addition to those sensors serving as biomass portion sensor 26.

In one implementation, harvested portion sensor 248 comprises an acoustic sensor carried by harvester 22 so as to output signals based upon the impact of the harvested portion with surfaces of harvester 22. For example, in one implementation, harvested portion sensor 248 comprises an acoustic sensor so as to output signals based on impact of ears of corn with a stripper plate or with the snout of a corn head.

In another implementation, harvested portion sensor 248 comprise one or more accelerometers coupled to surfaces of harvester 22 which output signals based upon impact of harvested portion with surfaces of harvester 22. For example, in one of limitation, harvested portion sensor 248 comprises one or more accelerometers mounted to or otherwise supported by stripper plates of a corn head, wherein the force of impact of ears of corn with the stripper plates, in combination with other factors such as the velocity of the harvester, are used to determine a quantity of the harvested portion 32, such as mass of grain. In yet other implementations, harvested portion sensor 248 comprises other types of sensors, such as deflection sensors and the like. In yet other implementations, harvested portion sensor 248 comprises combinations of different types of sensors to facilitate enhanced sensing, accuracy, and reliability.

Location indicator 250 comprises one or more electronic components or devices configured to determine and/or track a geographic location of harvester 22. In one implementation, location indicator 250 comprises a geo-referencing system comprising a receiver as part of a global positioning satellite system or global navigation satellite system. In yet other implementations, location indicator 250 may comprise other geo-referencing mechanisms or devices which facilitate geo-referencing of harvester 22 with respect to the field being traversed.

Controller 252 comprises one or more electronic components configured to receive and utilize signals from biomass portion sensor 26 as well as other sensors from system 220 to determine attributes of biomass portion 34 and to utilize such determined attributes for producing output 254. In one implementation, controller 252 is carried by harvester 22. In another implementation, controller 252 is remotely located with respect to harvester 22, such as at a remote office site, on another vehicle, or a central server facility, wherein the remotely located controller receive signals from harvester 22 across a local area network or a wide area network, such as the Internet. As schematically shown by FIG. 3, controller 252 comprises processor 256 and memory 258 comprising attribute determination module 260 and output module 262.

Processor 256 comprises one or more processing units configured to carry out instructions contained in memory 258. According to one example, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit, from a read only memory (ROM), a mass storage device, or some other persistent storage. In other embodiments, hard wired circuitry may be used in place of or in combination with software instructions to implement the functions described. For example, controller 252 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 258 comprises a non-transitory computer-readable medium or persistent storage device. Attribute determination module 260 comprises code, programmed logic or programming to direct processor 256 in the determination of one or more attributes of biomass portion 34 based upon signals received from biomass portion sensor 26. In the example illustrated, attribute determination module 260 additionally directs processor 256 in the determination of one or more attributes of harvested portion 32 based upon signals received from harvested portion sensor 248. In one implementation, attribute determination module 260 directs processor 256 to consult a previous the compounded historical lookup table, stored in memory 258 or stored elsewhere, associating different signals from sensor 26 and sensor 248 to different attribute values for biomass portion 34 and harvested portion 32, respectively. In yet another implementation, attribute determination module 260 directs processor 256 to determine the one of more attributes of biomass portion 34 and harvested portion 32 by using signals from sensors 26 and 248 as input to one or more mathematical formulas or algorithms.

Output module 262 comprises code, programmed logic or programming to direct processor 256 to utilize the determine attributes of biomass portion 34 to produce output 254. In the example illustrated, output module 262 causes processor 256 to prompt a person to select of one or more of the various output options of output 254 using a touch screen or other input device.

Output 254 comprises various output media for which the one of more determine attributes of biomass portion 34 are used for enhanced crop management. As shown by FIG. 3, output 254 comprises display 270, biomass portion data storage 272, biomass portion-location data storage/map 274, biomass portion-harvested portion data storage 276, biomass portion-harvested portion-location data storage/map 278 and adjustment module 280. Display 270 comprises a display, monitor or screen on which the determined attributes for biomass portion 34 are displayed. In one implementation, display 270 presents the determined attributes on a monitor, carried by harvester 22 or located at a facility remote from harvester 22, as harvester 22 is separating harvested portion 32 from biomass portion 34. Such information presented on display 270 allows a manager, operator or other person to view the current attributes of biomass portion 34 and make manual adjustments to the control of harvester 22 during harvest.

Biomass portion data storage 272 comprises a database or other memory upon which are stored the determined attributes of biomass portion 34. In one implementation, data storage 272 is located on harvester 22. In another implementation, data start 272 is located at a remote site, such as part of a remote server. The biomass attributes stored in data storage 272 facilitate subsequent viewing and subsequent use in the management of the field from which the biomass attributes were taken or crop management in other fields for similar plants 30.

Biomass portion-location data storage/map 274 comprises electronically stored values in the form of a table, map or other architecture linking the determined biomass portion attributes to different geo-referenced locations as determined based upon signals from location indicator 250. Data storage/map 274 identifies changes in the attributes of biomass portion 34 across a field. In one implementation, data start/map 274 facilitates determination by an operator or manager as to what portions of the field produce a greater quantity of biomass, what portions of the field were harvested with biomass portion 34 having a greater moisture content at the time of harvest and/or what portions of the field yielded a higher purity level of biomass portion 34 from plant 30 as compared to a level of foreign biomass. In other implementations, the data storage/map links or associates different attributes or changes in different attributes of biomass portion to different regions or locations of a field producing the biomass.

Biomass portion-harvested portion data storage 276 comprises a data storage, in the form of a table, graph, or other data architecture, associating the determined attributes of biomass portion 34 with the corresponding attributes of harvested portion 32. In one implementation, data storage 276 stores for each plant or group of plants, one or more attributes for the harvested portion 32 of the individual plant, or group of plants, and one of more attributes for the biomass portion 34 of the same corresponding plant, or group of plants. By way of example, plant grouping A may have the first yield or quantity for the harvested portion 32 and a first yield or quantity for the biomass portion 34, whereas plant grouping B have a second different yield or quantity for the harvested portion 32 and a second different yield or quantity for the biomass portion 34. Data storage 276 facilitates determination of a relationship between one or more attributes of the harvested portion 32 as compared to one or more attributes of the biomass portion 34. In one implementation, this relationship is stored on an individual plant by plant basis. In another implementation, this relationship is stored for a group of plants.

Biomass portion-harvested portion-location data storage/map 278 comprises electronically stored values in the form of a table, map, or other architecture, linking the determined biomass portion attributes plant groupings to determined harvested portion attributes for the same plant groupings to different geo-referenced locations, as determined based upon signals from location indicator 250. Data storage/map 278 identifies changes in both the attributes of biomass portion 34 and harvested portion 32 across a field. In one implementation, data store/map 278 facilitates determination by an operator or manager, as to what portions of the field produce a greater quantity of biomass 34 with a corresponding greater quantity of harvested portion 32, what portions of the field were harvested with a greater yield of harvested portion 32, but with biomass portion 34 having a greater moisture content at the time of harvest and/or what portions of the field had a greater yield of harvested portion 32 and a higher purity level of biomass portion 34 from plant 30 as compared to a level of foreign biomass. In other implementations, the data storage/map links, or associates different attributes, or changes in different attributes of biomass portion 34 and harvested portion 32 to different regions or locations of a field producing the biomass.

Adjustment module 280 comprises code or program logic contained in memory 258 or another memory, which causes processor 256 or another processor to generate control signals making adjustments based upon the determined biomass attributes. In one implementation, adjustment module 280 adjusts the operation of harvester 22 based at least upon the determined one or more attributes of biomass portion 34. In one implementation, adjustment module 280 adjusts the operation of harvester 22 in real time, as harvester 22 is traversing a field during harvest. Examples of adjustments to harvester 22 include, but are not limited to, adjusting a speed at which harvester 22 is traveling across the field, a height of a header of the harvester which interacts with plants 30 and one or more harvested portion-biomass portion separation parameters or settings such as settings for separation opponents 42 are discharged/treatment components 44. For example, based upon signals indicating changes in one or more determined attributes for biomass portion 34, harvester adjust module 280 may direct processor 256 to output control signals adjusting the speed, torque and/or positioning of components such as stripper plates, harvester threshing drums and concaves, straw walkers, sieves, grain return systems, beaters, and other threshing mechanisms.

In another implementation, adjustment module 280 makes one or more future adjustments to a field or crop management or mission plan, which is electronically generated and presented, or read, to facilitate management of crops and fields. For example, in one implementation, a mission plan is a computer stored detailed plan regarding various management decisions or parameters for various field operations. Such a plan is generated using inputs from an operator and prior historical data retrieved from various electronic databases regarding parameters or historical data such as growing cycles, soil characteristics, weather characteristics, fertilizer, insecticide herbicide characteristics, historical fertilizer, insecticide and herbicide applications for a field and the like. Such a plan may assist in determining not only what particular operations should be carried out but when such particular operation should be carried out. In some implementations, the mission plan comprises programmed equipment controls or a control script, which, when read from mission plan and processed, cause generation and output of control signals that automatically adjust one or more operational parameters of the equipment as it is traversing a field.

Figure 4:
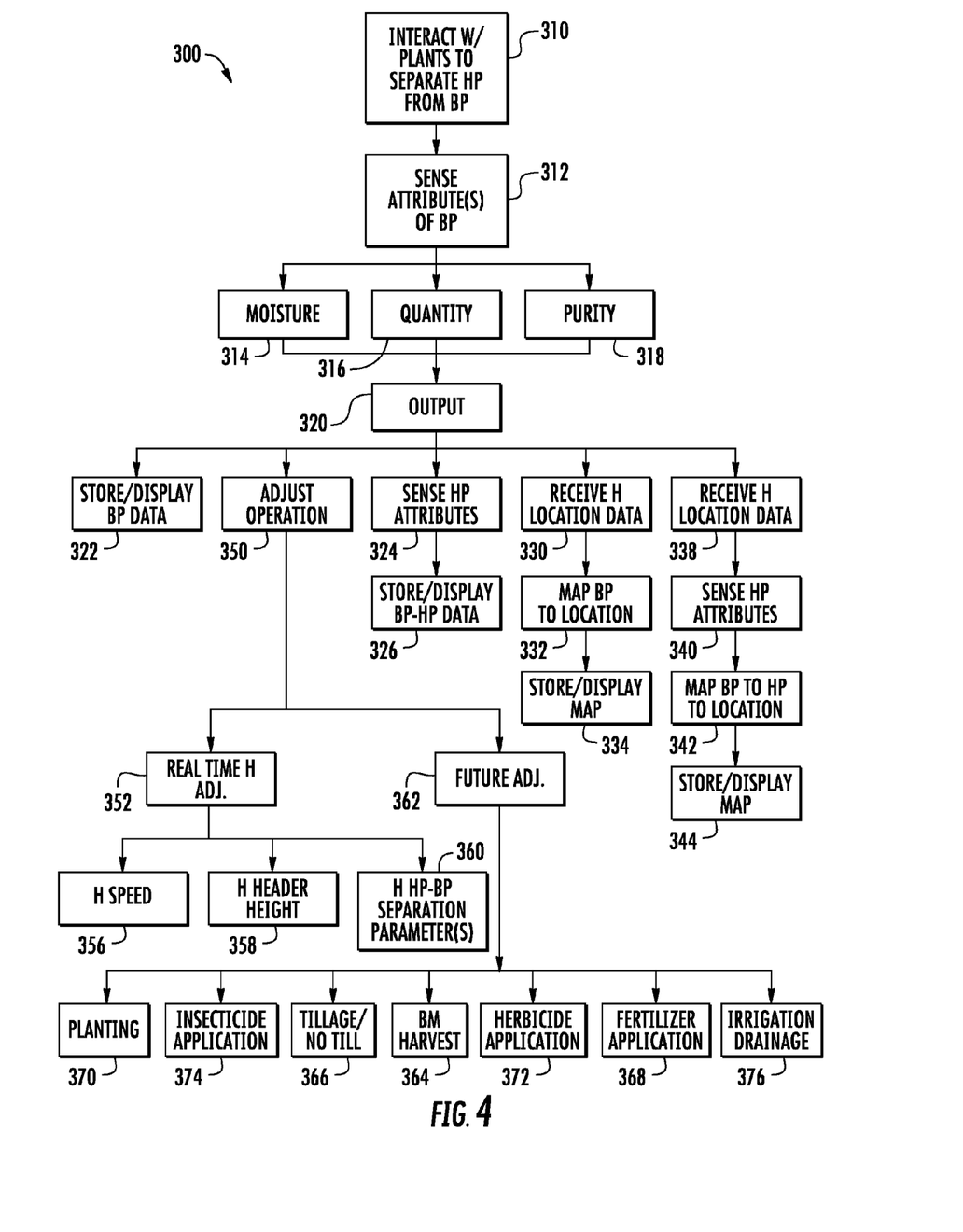
FIG. 4 is a flow diagram of an example method for determining and utilizing biomass attributes.

FIG. 4 is a flow diagram of an example method 300 that may be carried out or implemented to detect one or more attributes of biomass portion 34 and to produce output based upon the one or more attributes of biomass portion 34. As indicated by block 310, harvester 22 interacts with plants 30 to separate harvested portion 32 from biomass portion 34. In one implementation, the separated harvested portion 32 is gathered or collected in a tank on harvester 22. In another implementation, the separated harvested portion 32 is discharged from harvester 22 into a tank on another vehicle traveling with harvester 22 across a field or is discharged onto the ground for subsequent collection.

As indicated by block 312, biomass portion sensor 26 senses one or more attributes of biomass portion 34. In one implementation, such sensing is carried out using one or more acoustic sensors sensing interaction of plant 30 with harvester 22. In another implementation, such sensing is carried out using one or more capacitive sensors carried by harvester 22. In yet another implementation, such sensing is carried out using one or more force or deflection sensors. In yet other implementations, such sensing is carried out using multiple sensors of distinct types, such as combinations of acoustic, capacitive and/or force-deflection sensors.

As indicated by blocks 314, 316 and 318, attribute determination module 258, carried out by processor 256, analyzes the signals output by biomass portion sensor 26 to determine one or more attributes of biomass portion 34 such as moisture, quantity, and purity, respectively. In one implementation, the manager operator is permitted to select which attributes are identified. In other implementations, additional or alternative attributes for biomass portion 34 are determined by attribute determination module 260.

As indicated by block 320, output module 262 directs processor 256 to use such determined attributes for biomass portion 34 to produce one or more forms of output. As indicated by block 322, output module 262 directs processor 256 to store and/or display the determined attribute data for biomass portion 34. In one implementation, display 270 presents the determined attributes on a monitor, carried by harvester 22 or located at a facility remote from harvester 22, as harvester 22 is separating harvested portion 32 from biomass portion 34. Such displayed information allows a manager, operator or other person to view the current attributes of biomass portion 34 and make manual adjustments to the control of harvester 22 during harvest.

As indicated by block 324, in yet another implementation or when operating under another selected operational mode, attribute determination module 260 receives signals indicating one or more attributes of harvested portion 32 and determines one or more attributes of harvested portion 32 from such signals. As indicated by block 326, output module 262 directs processor 256 to store and/or display a presentation associating the determined attributes of biomass portion 34 with the corresponding attributes of harvested portion 32. In one implementation, for each plant or group of plants, one or more attributes for the harvested portion 32 of the individual plant or group of plants and one of more attributes for the biomass portion 34 of the same corresponding plant or group of plants are stored or displayed. By way of example, plant grouping A may have the first yield or quantity for the harvested portion 32 and a first yield or quantity for the biomass portion 34, whereas plant grouping B have a second different yield or quantity for the harvested portion 32 and a second different yield or quantity for the biomass portion 34. In one implementation, this relationship is stored on an individual plant by plant basis. In another implementation, this relationship is stored for a group of plants.

Figure 5:
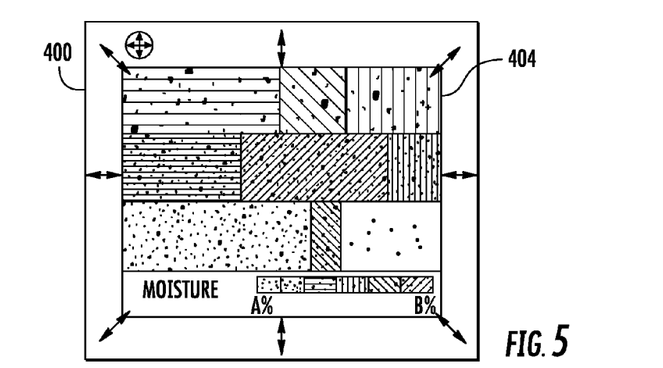
FIG. 5 is a diagram of an example display of a map for biomass moisture content.
Figure 6:
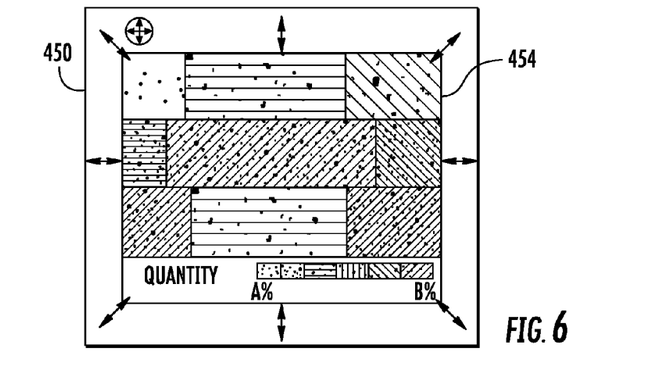
FIG. 6 is a diagram of an example display of a map for biomass quantity.

As indicated by block 330, 332 and 334, in yet another implementation or another selectable mode of operation, output module 262 maps the determined one or more attributes of biomass portions 34 to particular geo-referenced locations in a field, examples of which are shown in FIGS. 5 and 6 described hereafter. As indicated by block 330, controller 252 receives location data or geo-referencing information from location indicator 250 (shown in FIG. 3) indicating the location of harvester 22 as harvester 22 is traversing a field during harvest. As indicated by block 332, output module 262 links, maps or associates the one or more determined attributes of biomass 34 to the geo-referenced locations from which the biomass portions 34 of plants 30 originated. As indicated by block 334, output module 262 stores and/or displays the mapped biomass attributes to geo-referenced locations.

As indicated by blocks 338, 340, 342 and 344 of FIG. 4, in yet another implementation or another selectable mode of operation, output module 262 maps the determined one or more attributes of biomass portions 34 and their associated harvested portion attributes to particular geo-referenced locations in a field. As indicated by block 338, processor 256 of controller 252 receives location data or geo-referencing information from location indicator 250 (shown in FIG. 3) indicating the location of harvester 22 as harvester 22 is traversing a field during harvest. As indicated by block 340, attributes for harvested portion are sensed. In particular, controller 252 receives signals from harvested portion sensor 248, wherein attribute determination module 260 determines attributes for harvested portion 32. As indicated by block 342, output module 262 links, maps or associates the one or more determined attributes of biomass 34 and their associated harvested portion attributes to the geo-referenced locations from which the biomass portions 34 of plants 30 originated. As indicated by block 344, output module 262 stores and/or displays the mapped biomass attributes and harvested portion attributes to geo-referenced locations.

As indicated by block 350, in yet another implementation or a particular selected mode of operation, output module 262 transmits one or more determined attributes of biomass portion 34 to an adjustment module 280 which causes processor 256 to facilitate one or more present or future adjustments. As indicated by block 352, in one implementation, such adjustments are made to harvester 22 in real time. In other words, as harvester 22 is crossing a field while separating the harvested portion 32 and the biomass portion 34 of plants 30, adjustment module 280 (shown in FIG. 3) is continually or periodically causing processor 256 to output control signals to adjust one or more operational parameters of harvester 22 "on-the-fly". As indicated by block 356, in one implementation, harvester adjust module 280 causes processor 256 to output control signals causing the speed of harvester 22, the velocity at which harvester 22 is traveling across a field, to be adjusted. As indicated by block 358, in one implementation, harvester adjust module 280 causes processor 256 to output control signals causing the height of harvester 22 or the height of the harvesting head of harvester 22 to be adjusted. As indicated by block 360, in one implementation, harvester adjust module 280 causes processor 256 to output control signals adjusting one or more separation and/or discharge parameters of harvester 22. For example, based upon signals indicating changes in one or more determined attributes for biomass portion 34, adjustment module 280 may direct processor 256 to output control signals adjusting the speed, torque and/or positioning of components such as stripper plates, harvester threshing drums and concaves, straw walkers, sieves, grain return systems, beaters and other threshing mechanisms.

As indicated by block 362, in one implementation, output module 262 directs processor 256 to make one or more future adjustments to a field or crop management or mission plan which is electronically generated and presented to facilitate management of crops and fields. For example, in one implementation, a mission plan is a computer stored detailed plan regarding various management decisions or parameters for various field operations. Such a plan is generated using inputs from an operator and prior historical data retrieved from various electronic databases regarding parameters or historical data such as growing cycles, soil characteristics, weather characteristics, fertilizer, insecticide herbicide characteristics, historical fertilizer, insecticide and herbicide applications for a field and the like. Such a plan may assist in determining not only what particular operations should be carried out but when such particular operation should be carried out. In some implementations, the mission plan comprises programmed equipment controls or control inputs which, when read from mission plan and processed cause generation and output of control signals that automatically adjust one or more operational parameters of the equipment as it is traversing a field.

As indicated by block 364, in one implementation, output module 262 directs processor 256 to adjust biomass harvest operations of a mission plan. For example, in response to a determination that biomass portion 34 has a high moisture content or that particular regions of the field produce biomass portions having higher moisture content, output module 262 adjust a mission plan's recommended timing for harvest of the biomass from the field or the recommended timing for harvest of the biomass from particular regions of the field.

In one implementation, such a mission plan comprises an operational control script for controlling operational settings for equipment during operations carried out in a field. Such a control script comprises an electronic or digital script contained in a computer-readable medium and including various operational settings for a piece of equipment that are assigned to different geo-referenced locations in a field, wherein such operational settings for the equipment are automatically triggered based upon the current location of the equipment as indicated by signals from a global navigation satellite system or other geo-referencing source. Such a control script functions similarly to cruise control for a vehicle, automatically setting the operational parameters of the equipment based upon its location in a field, while permitting such operational parameters to be overridden by the operator. During operations on the field and as the equipment traverses the field, one or more processors of an equipment or a remote controller of the equipment reads the control script and automatically adjusts operational parameters based upon settings or control cues in the control script and based upon geo-referenced location data as the equipment traverses a field.

In one implementation, based upon the determined quantity of biomass portion 34 at different regions of a field, such as using map 454 in FIG. 6, output module 262 adjusts or creates operational control cues in the control script such that when the control cues in the control script are read by a controller of the biomass harvesting equipment, the controller outputs control signals automatically adjusting operational parameters of the biomass harvesting equipment depending upon from what region of the field biomass is about to be harvested. For example, in response to geo-referenced signals indicating that the piece of biomass harvesting equipment is about to harvest a particular region of the field having a higher quantity of biomass, the controller of the equipment, following the control script, causes the processor to output control signals adjusting operational settings of the biomass harvester to accommodate the additional quantity of biomass in the particular region of the field.

As indicated by block 366, in one implementation, output module 262 directs processor 256 to adjust tillage/no till operations of a mission plan for the field. For example, based upon one or more determined attributes of the biomass, such as moisture content or quantity, output module 262 directs processor 256 to adjust what tillage operations are performed, when such tillage operation are performed and/or the operational settings for the equipment performing such tillage operations. In one implementation, output module 262 adjusts a control script for the equipment that is recommended to carry out the recommended tillage operation following harvest or the following spring. For example, in one implementation, output module 262 adjusts the height or depth at which the tillage equipment interacts with the soil depending upon the quantity or density of biomass in a particular region of the field.

As indicated by blocks 368, 370, 372, 374 and 376, in other implementations or indifferent selectable modes, output module 262 further directs processor 256 to implement other changes to a mission plan for the field, or a different field to be planted with similar plants and having similar characteristics, based upon the determined biomass attributes. As indicated by block 368, output module 262 directs processor 256 to adjust a mission plan and/or control script controlling when fertilizer is applied, what type of fertilizer or fertilizers are applied, where such fertilizers are to be applied in the field, at what rate such fertilizers are to be applied in the field or operational parameters of the fertilizer application equipment when traversing different regions of the field based upon one or more attributes of biomass 34 at different regions of the field. As indicated by block 370, output module 262 directs processor 256 to adjust a mission plan and/or control script controlling when planting during the next growing season is to occur, what type of seed or growing stock are to be used, where such seed or growing stock are to be planted in the field, at what rate such seed or growing stock are to be planted in the field or operational parameters of the planting equipment when traversing different regions of the field based upon one or more attributes of biomass 34 at different regions of the field. As indicated by blocks 372 and 374, output module 262 directs processor 256 to adjust a mission plan and/or control script controlling when herbicide and/or insecticide is applied, what type of herbicide and/or insecticide is applied, where such herbicide and/or insecticide is to be applied in the field, at what rate such herbicide and/or insecticide is to be applied in the field or operational parameters of the application equipment when traversing different regions of the field based upon one or more attributes of biomass 34 at different regions of the field. As indicated by block 376, output module 262 directs processor 256 to adjust a mission plan and/or control script controlling when drainage or irrigation operations are carried out, where such drainage or irrigation operations are to be applied in the field, at what rate such greater tillage operations are to be carried out in the field or operational parameters of the drainage or irrigation equipment when traversing different regions of the field based upon one or more attributes of biomass 34 at different regions of the field.

FIG. 5 is a diagram of an example display screen 400 of a monitor presenting an example of a map 404 of a portion of field mapping a determined biomass moisture attribute for the biomass of different plants 30 grown in different regions of the field. As shown by FIG. 5, a person may zoom in, zoom out or pan across to view different portions of the field and their associated biomass moisture values. Map 404 enables a person, such as a manager, operator or the like, to visibly ascertain the moisture content of the biomass remaining in different portions of the field after harvesting.

FIG. 6 is a diagram of an example display screen 450 of a monitor presenting an example map 454 of a portion of the field mapping a determined biomass quantity attribute for the biomass of different plants 30 grown in different regions of the field. As with screens 400, a person may zoom in, zoom out or pan across to view different portions of the field and their associated biomass moisture values. Map 454 enables a person, such as a manager, operator and the like, to visibly ascertain the quantity, such as mass or volume, of biomass remaining in different portions of the field after harvesting.

Figure 7:
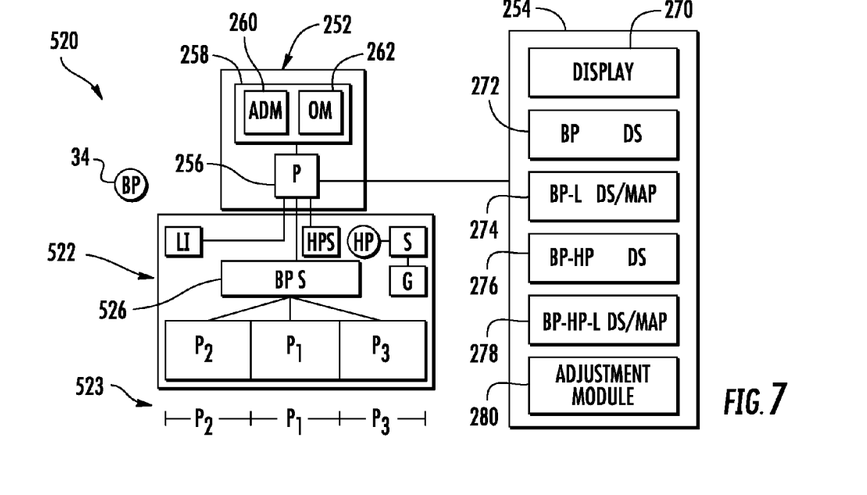
FIG. 7 is a schematic diagram of another example biomass sensing system.

FIG. 7 schematically illustrates another example biomass sensing system 520. Biomass sensing system 520 senses one or more attributes of biomass portions 34 of the harvested plants 30 with an enhanced resolution. In an example embodiment, the term "resolution" refers to the level of detail with regard to geo-location data with regard to biomass and/or field maps. Resolution for crop data or field maps may be determined by the smallest unit for which an attribute is sensed or for which an attribute is derived. Generally, the smaller the unit, the greater the resolution. Biomass sensing system 520 outputs biomass data and maps a field using sensed or derived attributes and/or identified conditions for individual units or portions of the field having a width less than a utilized crop harvesting width of a harvester. For example, even though a harvester may have a harvesting swath of 12 rows, crop yield sensing system 20 may output biomass data or field maps providing biomass attributes such as, quantity, moisture content or purity, for less than 12 rows, such as on a row-by-row basis or even a plant-by-plant basis. Biomass sensing system 520 may be similarly implemented with respect to non-row crops and non-row harvesters. The greater crop data resolution provided by biomass sensing system 20 facilitates more advanced and sophisticated crop management.

Biomass sensing system 520 comprises harvester 522, processor 530, memory 532 and output 534. Harvester 522 comprises an agricultural machine configured to collect, gather or harvest crops. Harvester 522 gathers or harvests such crops along an area or swath 523 comprising portions P1, P2 and P3. Each portion of harvester 522 harvests the crops from a distinct region of a field. In one implementation, portions P1, P2 and P3 of harvester 522 comprise individual row units to harvest individual crop rows. In another implementation, portions P1, P2 and P3 of harvester 22 comprise groups or subsets of individual row units. In some implementations, the crops are not grown in rows, wherein each portion of harvester 22 harvests a distinct area of the crops along the swath 23 of harvester 522.

Harvester 522 is similar to harvester 22 described above with respect to FIGS. 1 and 3 except that harvester 522 comprises biomass portion sensor 526. Those remaining components of harvester 522 which correspond to components of harvester 22 are numbered similarly in FIG. 7 or are shown in FIGS. 1 and 3. Biomass portion sensor 526 comprises one or more sensors configured to detect or sense one of more attributes of biomass of plants being harvested by individual portions P1-P3 of swath 523 of harvester 522. Although harvester 22 is illustrated as including three of such portions, in other implementations, swath 23 of harvester 22 may be partitioned into a greater or fewer of such portions, wherein one or more of such portions are assigned one or more sensors that determine one or more biomass attributes for the crop being harvested by each individual portion P1-P3.

In one implementation, biomass portion sensor 526 is similar to biomass portion sensor 26 described above except that biomass portion sensor 526 comprises multiple individual biomass portion sensors 26 (described above) spaced along swath 523, wherein each individual sensor 26 senses and output signals based upon the one or more attributes of biomass of the plants being harvested by the particular portion, such as a particular row unit. In some implementations, biomass portion sensor 526 may comprise multiple biomass portion sensors 26 spaced along swath 523, wherein at least some of biomass portion sensor 26 output signals for multiple adjacent portions such that such portions of swath 523 share some of biomass portion sensors 26. In yet other implementations, biomass portion sensor 526 comprises a single sensor, such as a camera, that senses biomass attributes for each of portions P1-P3, but outputs different signals for different portions of swath 523, distinguishing the biomass attributes for plants harvested in one portion as compared to another portion of swath 523.

Biomass sensing system 520 operates similar to biomass sensing system 220 described above except that biomass sensing system 520 collect one or more biomass attributes, maps the one or more biomass attributes to geospatial locations and/or carries out adjustments with respect to harvester 522 or with respect to future mission plans/control scripts at a higher resolution, for each of portions P1-P3 of swath 523. For example, output 254, depending upon the selected mode of operation, comprise display 270 which presents biomass attributes for each of portions P1-P3. Data storage 272 which stores biomass portion attributes for each of portions P1-P3. Data storage/map 274 maps biomass portion attributes to geospatial locations on a portion by portion basis of swath 523, similar to maps 404 and 454 shown in FIGS. 5 and 6, but with a resolution that of the size of portions P1-P3. Data storage/map 278 maps biomass portion attributes to harvested portion attributes to geospatial locations on a portion by portion basis of swath 523. Adjustment module 280 adjusts individual operational parameters for individual portions P1-P3 of harvester 522 as it crosses a field or adjusts a mission plan or control scripts for portions of a field that have a width less than the width of swath 523, nominally equal to the width of portions P1-P3. In other words, biomass sensing system 520 carries out each of the steps of method 300, but on a row by row or portion by portion basis depending upon the number of rows or portions which are individually sensed by the one or more biomass portion sensors 526.

Figure 8:
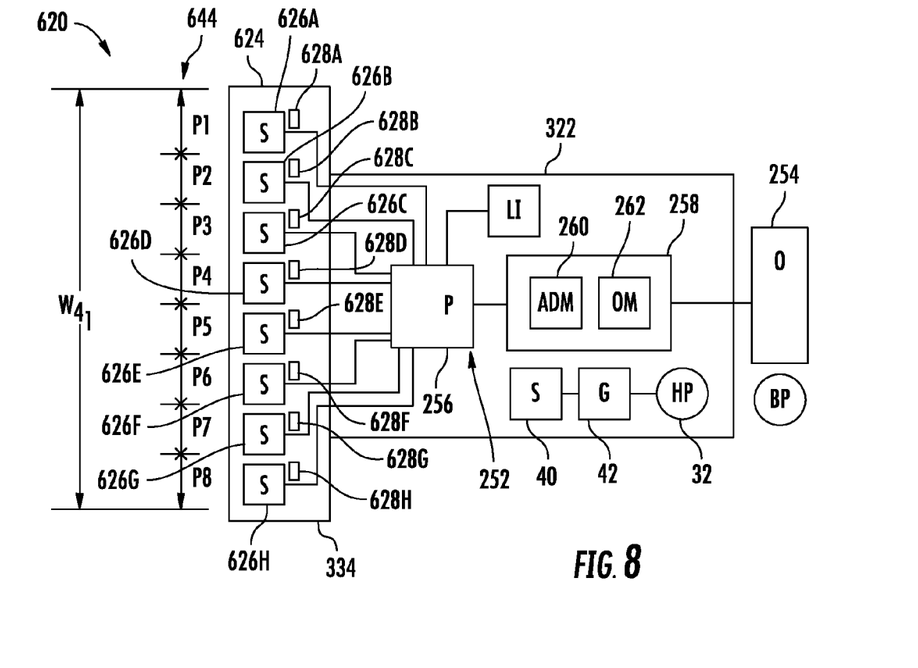
FIG. 8 is a schematic diagram of another example biomass sensing system.

FIG. 8 schematically illustrates biomass sensing system 620, a particular implementation of biomass sensing system 520. Biomass system 620 comprises an agricultural machine, an example of which is the illustrated harvester 622. Harvester 622 comprises a mobile machine configured to travel across a field or plot of land while harvesting a crop. Harvester 622 is similar to harvester 522 except that harvester 622 comprises head 624, sensors 626A-626H (collectively referred to as sensors 626) and sensors 628A-628H

(collectively referred to as sensors 628). Those remaining components of harvester 622 which correspond to components of harvester 522 are numbered similarly.

Head 624 comprises a mechanism configured to gather and harvest a crop along a swath. The swath of head 624 has a utilized width, Wu, when harvesting crops. In an example embodiment, the utilized width Wu constitutes that portion of the length or swath width that is being utilized to harvest crops at a particular time. Although in most instances, the utilized width Wu is equal to the physical length of the swath of head 624, in some circumstances, the utilized width Wu may constitute only a portion of the swath of head 624, such as along an end row, waterway and/or the like. Head 624 includes various mechanisms for harvesting, such as mechanisms to sever or separate the crop from a remainder of a plant. Such mechanisms may include knives or blades, stripper plates, rollers, snapping roles, augers, gathering chains or belts and/or the like. In one implementation, head 624 comprises a corn head for a combine, wherein the corn head separates ears of corn from the remaining stalk. In another implementation, head 624 comprises a head having stripper plates or other mechanisms to sever other types of ears from associated stalks. In one implementation, the term "ear" refers to a seed-bearing part of a plant, such as ears of corn, seed laden flowers such as sunflowers, pods and the like. In another implementation, head 624 may comprise a crop head for a combine, wherein the grain along with the stalk is severed and subsequently threshed by the combine. In other implementations, head 624 may have other configurations. For example, although head 624 is illustrated as being located at a forward end of harvester 622 and as being interchangeable with other heads (facilitating the change of corn and grain heads), in other implementations, head 624 may be supported at other locations by harvester 322 and/or may be a permanent, non-interchangeable component of harvester 622.

Sensors 626 comprise mechanisms to sense or detect one or more attribute values for the biomass portion 34 of plants 30. Each of sensors 626 is similar to sensor 26 described above. Sensors 626 detect one or more biomass attribute values for the plants harvested by each portion of swath or harvesting width of head 624 along the entire swath of head 624. In one example embodiment, sensors 626 are located and carried by head 624. In one example embodiment, sensors 626 are provided in each row harvesting portion of head 334. In other implementations, sensor 626 may be provided at other locations.

Each of sensors 626 senses one or more biomass attribute values for crops harvested by a corresponding distinct portion of the utilized width Wu. Sensors 626 collectively detect multiple biomass attribute values for a plurality of distinct portions of the utilized width Wu. Said another way, each of sensors 626 senses only a portion of the total crop being harvested at any moment in time by head 624, wherein each of sensors 626 provide biomass attribute values for just that portion. For example, in one embodiment, each of sensors 626 may sense a crop attribute for plants along an individual row, providing "per row" biomass attributes.

As shown by FIG. 8, in one circumstance, the entirety of head 334 may be receiving and harvesting crops such that the utilized width Wu of head 624 is substantially equal to the physical width or swath of head 624. Sensors 626 each detect a less than whole portion or a fraction of the crop being harvested by the utilized width Wu. As indicated by partitioning 644, the utilized width Wu is partitioned or divided into 8 equal portions P1-P8, wherein sensors 626A-626H each provide a distinct crop attribute value for crops received from portions P1-P8, respectively. Although head 624 is illustrated as including eight row units with a corresponding eight sensors, in other implementations, head 624 may include a greater or fewer number of such row units and sensors along the physical width or swath of head 624. For example, a crop row harvester may have greater than or less than eight rows, wherein the head of the harvester may similarly divide with greater than or less than eight row sensing sensors. Although head 624 is illustrated as being partitioned into equal portions, in other example embodiments, head 624 is partitioned into unequal portions, wherein sensors 626 sense biomass attributes for the unequal portions. For example, in another implementation, one of sensors 626 senses or detects biomass attributes for an individual row while another sensor 626 senses biomass attributes for a plurality of rows.

Figure 8A:
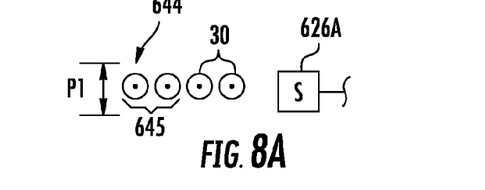
FIG. 8A is a schematic illustration of a portion of the biomass sensing system of FIG. 8.

As shown by FIG. 8A, in some implementations, each of sensors 626 may offer an even higher degree of crop sensing resolution by being configured to detect biomass attribute values for the individual plants 30 themselves. In some implementations, the sensed biomass attribute values for individual plants 30 may be aggregated into sets or collections 645 of plants based upon time, distance, a number of plants, and/or the like to reduce the amount of data that is processed or stored. Aggregating individual plant data may also improve usability of the data by eliminating noise in the data.

In one implementation, biomass portion sensors 626 output signals indicating a moisture content of the biomass portion 34. In one implementation, biomass portion sensors 626 output signals indicating a quantity or mass of biomass portion 34 interacted upon by harvester 622. In one implementation, biomass portion sensors 626 output signals indicating a purity or content of biomass portion 34. For example, in some circumstances, biomass portion 34 associated with plants 32 may be co-mingled or mixed with other biomass materials such as weeds and the like. In such an implementation, biomass portion sensors 626 output signals indicating what percentage or mass is associated with biomass portion 34 from plants 30 and what percentage or mass associated with foreign or extraneous biomass materials. In still other implementations, other attributes determinable from the signals output by biomass portion sensors 626.

In one implementation, biomass portion sensors 626 sense one or more attributes of biomass portions 34 that are severed, collected and otherwise pass through harvester 622. In another implementation, biomass portion sensors 626 sense one or more attributes of biomass portion 34 associated with plants 30, regardless of whether the biomass portion 34 passes through harvester 622 or remains rooted in the ground after harvested portion 32 has been collected by harvester 622. For example, in one implementation, biomass portion sensors 626 output signals which indicate one or more attributes of a portion of the stalk and leafage of plant 30 that is been severed and that is passing through harvester 22 and/or one or more attributes of a remainder of the stalk that remains rooted in the ground after such severing. In one implementation, the attributes of the remainder of the plant 30 that remains rooted in the ground after such severing is determined based upon signals resulting from biomass portion sensors 626 interacting with the portions of plants 30 that has been severed and that are passing through harvester 622.

In one implementation, biomass portion sensors 266 comprise one or more acoustic sensors, wherein sensors 626 output signals based upon the sound or acoustic pressure resulting from interaction of plant 30 with harvester 622. For example, in one implementation, each sensor 626 outputs signals based upon the sound resulting from plant 30 being impacted upon or striking a surface of harvester 622. For example, in one implementation, each sensor 626 senses the sound of the harvested portion 32 impacting a surface of harvester 22.

In one implementation in which harvester 622 comprises a combine for harvesting corn, each sensor 626 senses the impact of an ear of corn impacting stripper plates or other portions of the harvesting head of harvester 622. In another implementation, each sensor 626 senses the sound of biomass portion 34 impacting a surface of harvester 622. In one implementation in which harvester 622 comprises a combine harvesting corn, each sensor 626 senses the sound produced by the corn plant being severed or the sound produced by bending of the corn stock. Such sounds or crackling correspond to one or more attributes of biomass portion 34, such as the moisture content, quantity and/or purity of biomass portion 34.

In one example implementation of a corn header for harvesting corn, each biomass portion sensor 626 comprises one or more acoustic sensors mounted or supported high on a rearward facing "ear saver" surface on each of the snouts of the corn head with each sensor oriented such it is focused towards an ear impact zone on the stripper plates. In another example implementation of a combine header for harvesting corn, each biomass portion sensor 626 comprises one or more acoustic sensors mounted under a rear half of the snouts so as to sense or pick up the sound of the thud from an ear of corn hitting the snout. In yet another implementation of a corn header for harvesting corn, each biomass portion sensor 626 comprises one or more acoustic sensors mounted alongside the stalk rolls or rollers so as to sense the sound produced by interaction of the stalk rolls with the stalk, wherein the noise or acoustic pressure from the crackling is attributed to the relative moisture content or other attributes of biomass portion 34.

In another implementation, each biomass portion sensor 626 comprises one or more capacitive sensors. As portions of plant 30, such as harvested portion 32 or biomass portion 34, interact with or pass the surface, the capacitive sensor serving as biomass portion sensor 626 experiences or undergoes a change in capacitance. Signals indicating the change in capacitance further indicate one or more attributes of harvested portion 32 and/or biomass portion 34. In one implementation, such capacitive sensors detect the passing of dielectric material, wherein the more ion containing moisture in the material passing the capacitive sensor, the greater the signal output by the sensor. In one implementation, the capacitive sensor may comprise a grid to facilitate the detection of quantity or other attributes of biomass portion 34.

In one implementation, as schematically illustrated in broken lines, each biomass portion sensor 626 comprises a capacitive sensor located below a surface of harvester 622 that interacts with plant 30. In one implementation in which harvester 622 comprises a corn head, each biomass portion sensor 626 comprises one or more capacitive sensors that are coated or painted onto an underside or inside of a snout, protecting biomass portion sensors 626 from direct exposure to where the crop or plant 30 being processed or harvested. In yet other implementations, each biomass portion sensor 626 comprises one or more capacitive sensors that are laminated, bonded, adhered or otherwise secured to an underside inside of the snout or are mounted to other locations of the harvester head or at other locations downstream of the harvester head.

In yet another implementation, each biomass portion sensor 626 comprises a deflection sensor or force sensor which detects deflection of one or more surfaces of harvester 622 as a result of interaction with plant 30 or biomass portion 34. For example, in one implementation in which harvester 622 comprises a corn head for harvesting corn, each biomass portion sensor 626 comprises a deflection sensor to sense deflection or movement of stripper plates and/or stalk rollers of the head. Signals from the one or more deflection sensors indicate stalk thickness, which indicate a quantity or mass of biomass portion 34, and/or indicate a moisture content or purity content. Other examples of sensors 626 include, but are not limited to for example, light detection and ranging (LIDAR or LADAR), structured light or stereo camera vision, strain gauges, and/or accelerometers (where crop impact is sensed), and/or the like.

Sensors 628 comprise sensors configured to output signals indicating, directly or indirectly, one of more attributes of harvested portion 32 of plant 30. In one implementation, each harvested portion sensor 628 outputs signals indicating a quantity, such as mass or volume, of harvested portion 32 collected or separated by harvester 22. In one implementation, each harvested portion sensor 248 comprises one or more of the same sensors serving as biomass portion sensor 626. In another implementation, each harvested portion sensor 628 comprises sensors in addition to those sensors serving as biomass portion sensor 626.

In one implementation, harvested portion sensor 628 comprises an acoustic sensor carried by harvester 622 so as to output signals based upon the impact of the harvested portion with surfaces of harvester 22. For example, in one implementation, each harvested portion sensor 628 comprises an acoustic sensor so as to output signals based on impact of ears of corn with a stripper plate or with the snout of a corn head.

In another implementation, each harvested portion sensor 628 comprise one or more accelerometers coupled to surfaces of harvester 22 which output signals based upon impact of harvested portion with surfaces of harvester 22. For example, in one implementation, each harvested portion sensor 248 comprises one or more accelerometers mounted to or otherwise supported by stripper plates of a corn head, wherein the force of impact of a ears of corn with the stripper plates, in combination with other factors such as the velocity of the harvester, are used to determine a quantity of the harvested portion 32. In yet other implementations, each harvested portion sensor 248 comprises other types of sensors, such as deflection sensors and the like. In yet other implementations, each harvested portion sensor 248 comprises combinations of different types of sensors to facilitate enhanced sensing accuracy and reliability. In one implementation, processor 330, following instructions contained in memory 328, polls sensor 338. In yet another implementation, sensor 338 streams data to processor 330.

As in biomass sensing system 520, controller 252 in biomass sensing system 620 utilizes signals from biomass portion sensors 626 to determine attributes of biomass portion 34 and utilizes such determined attributes for producing output 254. In the example illustrated, in selected modes of operation, controller 252 additionally utilizes signals from sensors 628 to determine attributes of the harvested portion 32 of plants 30 to produce output 254. As noted above, output 254 may comprise an association of harvested portion attributes to biomass portion attributes. Because biomass sensing system 520 determines biomass attributes for plants harvested from each of the eight individual portions of head 624, biomass sensing system 620 offers enhanced data resolution and opportunities for more precise crop and field management.

Figure 9:
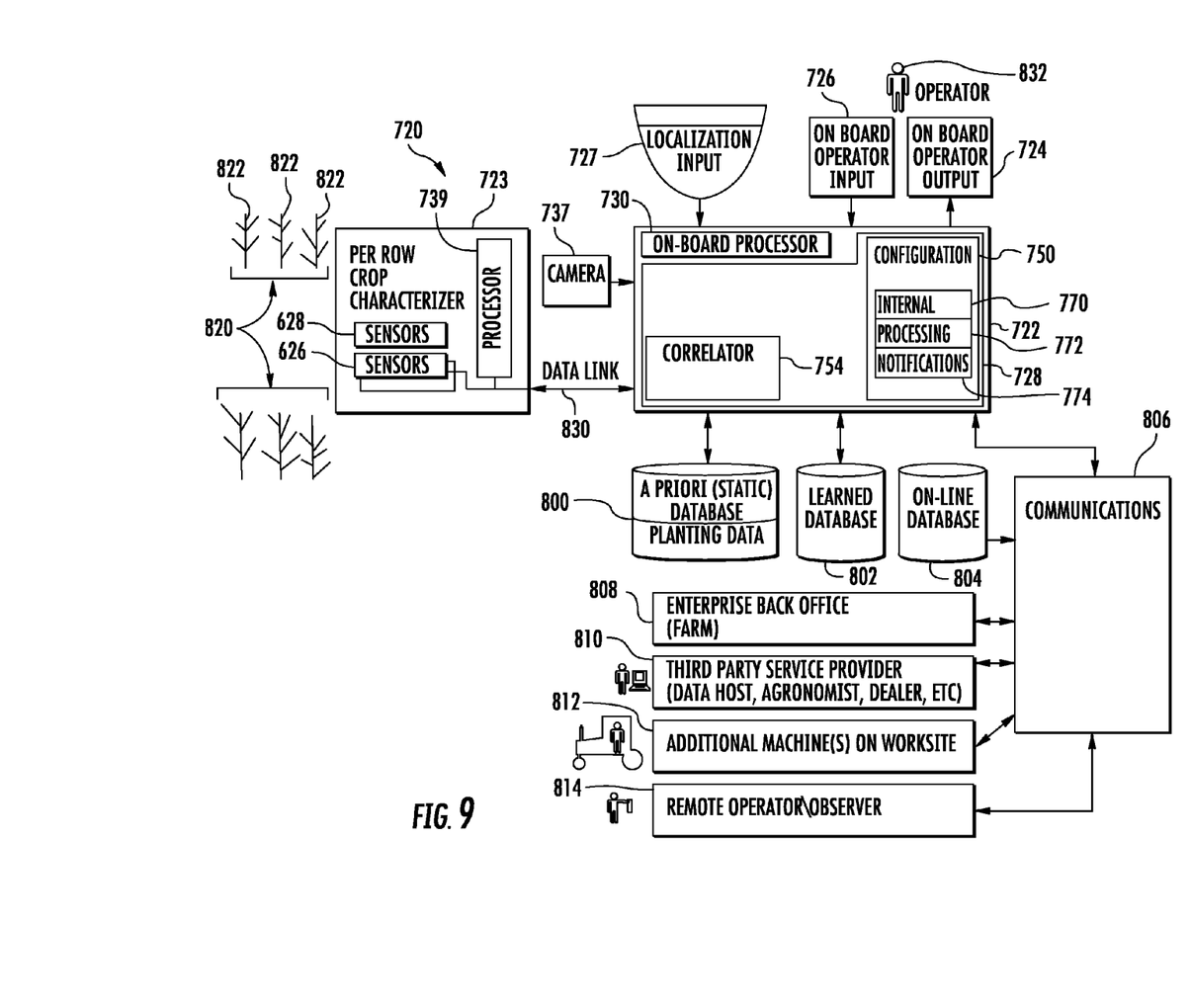
FIG. 9 is a schematic diagram of another example biomass sensing system.

FIG. 9 schematically illustrates biomass sensing system 720, an example implementation of biomass sensing system 20. Biomass sensing system 720 comprises crop characterizer 723, on-board operator output 724, on-board operator input 726, localization input 727, memory 728, on-board processor 730, static database 800, learned database 802, online database 804, communications 806, enterprise back office 808, third-party service providers 810, other on-site machines 812 and remote operators/observers 814.

Crop characterizer 723 comprises a device configured to sense or detect multiple values for a plurality of distinct portions of the utilized width of a harvesting machine. In the example described, crop characterizer 723 detects crop attributes or crop characteristics on at least a row-by-row basis. Individual row of crops 820 are independently sensed and different attribute values may be identified and stored for the individual rows. In the example described, crop characterizer 723 detects biomass attributes on a plant-by-plant basis. Individual plants 822 are independently sensed and different attribute values may be identified and stored for the individual plants or for a predefined aggregation of individual plants along a row 820 (for example, an aggregation based upon time, distance or plant count as described above). As a result, crop characterizer 723 facilitates data gathering and field maps having an enhanced resolution for more sophisticated analysis and crop management. In one example, crop attributes are defined by crop characterizing 723 on both a plant-by-plant basis and a row-by-row basis. In another example, crop attributes are defined for a selected one of the plant-by-plant basis or the row-by-row basis.

Crop characterizer 723 comprises sensors 626, sensors 628 and one or more cameras 737. Sensors 626 and 628 are described above. Sensors 66 and 628 comprise mechanisms to concurrently sense or detect one or more crop attribute values for multiple portions of a utilized crop harvesting width of the harvester. Said another way, each of sensors 626, 628 senses only a portion of the total crop being harvested at any moment in time by the harvester 722, wherein each of sensors 626 provide biomass attribute values for just that portion. As noted above, in one implementation, sensors 626 provide biomass attribute values on a row-by-row basis. In another implementation, sensors 626 provide biomass attribute values on a plant-by-plant basis.

In one implementation, camera 737 comprises an optical capture device carried by the harvester 722 to capture one or more rows 820 just prior to the harvesting of such rows 820. In one implementation, camera 737 captures images that are used to detect or determine one or more crop attributes or crop characteristics on a row-by-row basis or a plant-by-plant basis. In one implementation, camera 737 employs stereo vision or LIDAR for such detection. In one implementation, camera 737 captures images of the crop prior to harvesting, wherein the individual images or portions of video are linked to the crop attribute values detected by sensors 626, 628. These values may be stored. The captured images or video are linked and indexed in a time-based manner or location-based manner to particular regions, individual rows or individual plants for which data is detected by sensors 626, 6 to 8. As a result, when reviewing directly sensed crop attribute values (as detected by sensors 626) or derived crop attribute values for a particular region of a field, a particular set of rows of the field or a particular grouping of plants in the field, the operator may also retrieve and view images or videos of the actual region of the field, the particular rows of the field or the particular plants of the field corresponding to the data being viewed in a chart or map. Thus, system 720 allows an operator/monitor to visibly review the actual crops to either identify one or more conditions that may have affected the crop attribute such as yield or allow the operator/monitor to visibly confirm the crop/field condition identified by processor 730 as a reason for a particular crop yield or other attribute. For example, based upon data from sensors 626, 628, processor 730 may output a conclusion that a drop in yield was caused by a wet spot in the field. Camera 737 permits the operator to pull up (from memory) actual stored video images of the particular portion of the field to visually confirm the previously recorded data.

In the example illustrated, system 720 offers several modes of operations for characterizer 723. In one mode, sensors 626 and/or sensors 628 may be employed for crop characterization. In another mode, camera 737 may be employed for crop characterization. In yet another mode, both sensors 626, 628 and camera 737 may be utilized for crop characterization.

In some implementations, crop characterizer 723 may additionally comprise a local processor 739. Processor 739 receives signals from sensors 626, 628 and conditions such signals prior to their transmission to on-board processor 730 via data link 830. For example, in some implementations, processor 739 derives other crop attribute values from the signals prior to their transmission to processor 730. Processor 739 may filter such signals to reduce noise prior to transmission by link 830. In some implementations, processor 739 may trim data or compress data prior to transmitting such data across link 830 to processor 730 to reduce transmission and/or processing loads. In another implementation, processor 739 may be omitted.

On-board operator output 724 comprises one or more devices carried by harvester 722 by which information and data may be presented to an onboard operator of harvester 722. Output 724 may comprise a display comprising a monitor or screen with or without a speaker. On-board operator input 726 comprises one or more devices carried by harvester 722 by which selections and/or data may be input, entered and provided by a local operator 832 riding or operating harvester 722. Examples of input 726 include, but are not limited to, a keyboard, a touchpad, a touch screen, a steering wheel or steering control, a joystick, a microphone with associated speech recognition software and/or the like. In one implementation, input 726 may be provided as part of output 724 in the form of a touchscreen.

Localization input 727 comprises an input to processor 730 which provides geo-data to processor 730. In other words, input 727 provides location or positional information to processor 730. For example, in one implementation, localization input 727 may comprise a global positioning system (GPS) receiver. In other examples, other geo-data sources may be utilized.

Memory 728 comprises a non-transitory computer-readable medium or persistent storage device for storing data for use by processor 730 or generated by processor 730. In one implementation, memory 728 may additionally store instructions in the form of code or software for processor 730. The instructions may be loaded in a random access memory (RAM) for execution by processor 730 from a read only memory (ROM), a mass storage device, or some other persistent storage. In other embodiments, hard wired circuitry may be used in place of or in combination with software instructions to implement the functions described. For example, at least regions of memory 728 and processor 730 may be embodied as part of one or more application-specific integrated circuits (ASICs). In the example illustrated, memory 728 is carried by harvester 722. In other implementations, memory 728 may be provided remote from harvester 722.

In the example illustrated, memory 728 comprises configuration module 750 and correlation module 754. Configuration module 750 comprises software code and associated stored data regarding the configuration of system 720. In the example illustrated, configuration module 750 includes sub-modules which direct processor 730 to prompt for selections from an operator, to store such selections and to operate according to such various selections. The stored selections control how processor 730 handle and analyze data from characterizer 723 and how data or information is presented on output 724. In the example illustrated, configuration module 750 comprises interval sub-module 770, processing sub-module 772 and notification sub-module 774 which cooperate to present a display screen presenting biomass attribute and crop yield information. Interval sub-module 770 prompts for and stores operator input regarding how individual plants are to be aggregated. Processing sub-module 772 prompts for and stores operator input regarding how such data is to be processed, for example, using statistical values such as average, median or range. Notification sub-module 774 prompts for and stores display settings.

Correlation module 754 comprises programming, software or code for directing the operation of processor 730. Correlation module 754 instructs processor 730 in the correlation of one or more directly sensed crop attribute values detected by sensors 626, 628 to derived crop attribute values. In other words, correlation module 754, similar to attribute determination module 260, instructs processor 730 and the derivation of biomass attribute values, such as yield and/or the like, from directly sensed crop attribute values or possibly along with other factors or inputs. In one implementation, correlation module 754 directs processor 730 to consult a lookup table in a database to correlate signals produced by sensors 626 to one of more biomass attribute values, the derived biomass attribute value. In another implementation, correlation module 754 directs processor 730 to carry out one or more algorithms/mathematical equations based upon a sensed impact of a plant or grain, sense capacitance values, sensed forces or the like to derive a biomass attribute such as moisture content, quantity or purity. In other implementations, correlation module 754 may direct processor 730 to derived biomass attribute values from directly sensed crop attribute values in other fashions.

Static database 800 comprises a data storage containing data regarding historical or predefined data such as historical planting data, historical yield information, historical field or soil data (e.g., topography, soil type). Static database 800 may additionally contain tables and other information for correlating sensed crop attribute values to derived crop attribute values. Learned database 802 comprises a data storage containing data that varies as harvester 722 travels across the field. Database 802 stores the raw directly sensed crop attribute values from sensors 626, 638 and/or camera 737, camera captured video or images, derived crop attribute values, and varying or adjustable harvester operational parameters, for example, harvester velocity, head height, and other harvester settings. In one example, database 802 further stores GPS data.

In the example illustrated, static database 800 and learned database 802 comprise databases that are part of memory 728 on board harvester 722. In other implementations, such databases 800, 802 may be remote from harvester 722 and may be accessed through communication 806. Online database 804 comprises a database that is accessed through a wide area network or a local area network using communication 806. Online database 804 may contain additional information for use by processor 730 and harvester 722. Communication 806 comprises a communication network facilitating communication between harvester 722 and remote entities such as online database 804, office 808, service provider 810, other on-site machines 812 and remote operator/observer 814.

Enterprise back office 808 comprises a location remote from harvester 722 such as the home farm. Enterprise back office 808 may include computing devices and a database, wherein processor 730 transmits data stored in learned database 802 to office 808 through communication 806 for backup and/or remote analysis. Third-party service provider 810 comprises a server in communication with harvester 722 through communications 806 and associated with a third-party, such as an agronomist, a seed dealer, a seed company, a chemical, insecticide, or fertilize supplier, or third-party data storage host.

As indicated by FIG. 9, other harvesters or other machines on a particular worksite or field may also be in communication with harvester 722 through communications 806. As a result, sensed crop data may be shared amongst such multiple machines on a particular field or worksite. In some implementations, harvester 722 may communicate with the remote operator/observer 814 through communications 806. As a result, harvester 722 may be remotely controlled (the steering of harvester 722 and/or the adjustment of settings for the operation of crop sensing by harvester 722).

Figure 10:
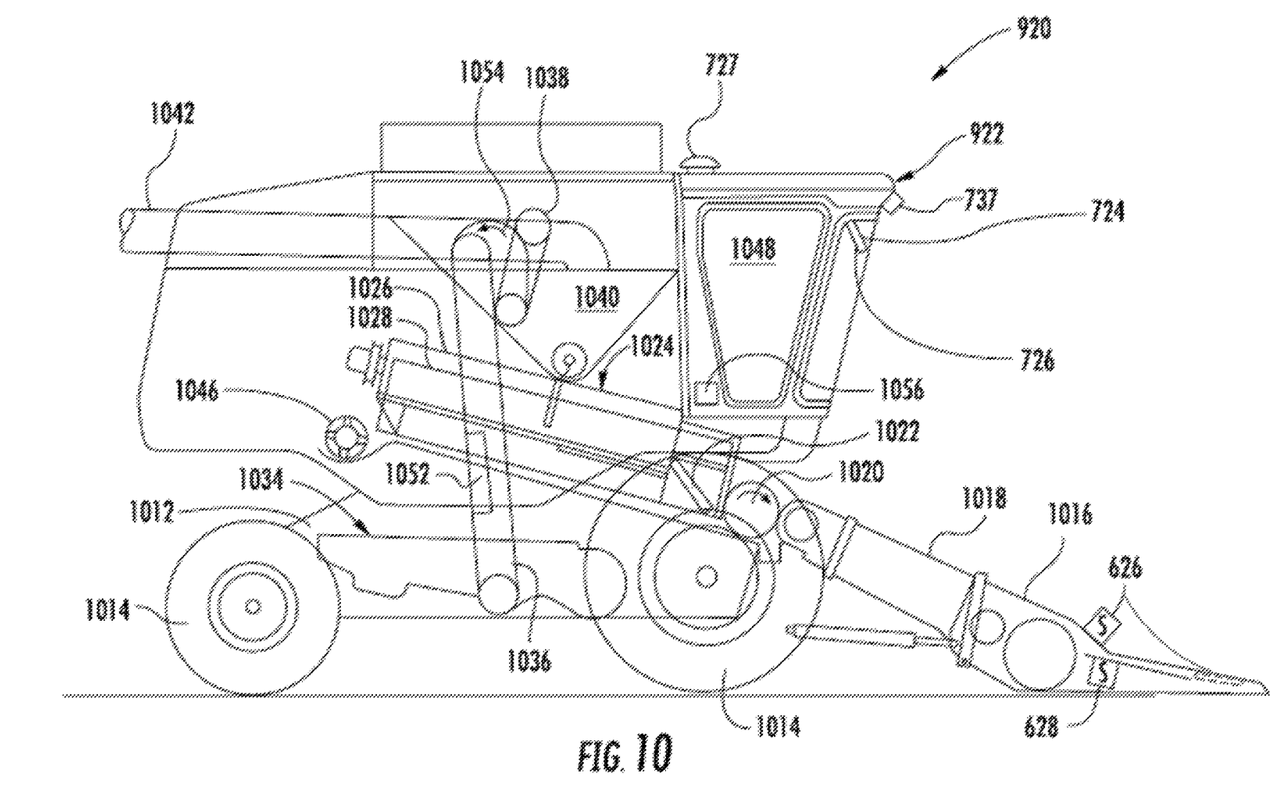
FIG. 10 is a side view of an example harvester provided as part of another example biomass sensing system.

FIG. 10 illustrates biomass sensing system 920, an example of biomass sensing system 20 or an example of biomass sensing system 720. FIG. 9 illustrates biomass sensing system 920 specifically as part of a harvester 922 (in the form of a combine). Biomass sensing system 820 comprises each of the components illustrated and described with respect to FIG. 9, some of which are shown and similarly numbered in FIG. 10.

Harvester 922 comprises a chassis 1012 which is supported and propelled by ground engaging wheels 1014. Although harvester 922 is illustrated as being supported and propelled on ground engaging wheels 1014 it can also be supported and propelled by full tracks or half-tracks. A harvesting assembly 1016 (shown as a corn head) is used to take up crop and to conduct it to a feeder house 1018. The crop is conducted by the feeder house 1018 to a beater 1020. The beater 1020 guides the crop upwardly through an intake transition region 1022 to a rotary threshing and separating assembly 1024. Although harvester 922 is described as a rotary combine, in other implementations, harvester 922 may comprise other types of combines (for example combines having a transverse threshing cylinder and straw walkers or combines having a transverse threshing cylinder and rotary separator rotors) or other agricultural harvesting machines including, without limitation, self-propelled forage harvesters, sugar cane harvesters, and windrowers The rotary threshing and separating assembly 1024 comprises a rotor housing 1026 and a rotor 1028 arranged in the rotor housing 1026. The harvested crop enters the rotor housing 1026 through the intake transition region 1022. The rotary threshing and separating assembly 1024 threshes and separates the harvested crop. Grain and chaff fall through grates at the bottom of the rotor housing onto a cleaning assembly 1034. The cleaning assembly 1034 removes the chaff and conducts the clean grain to a grain elevator 1036 which conducts upwardly to a distributing screw conveyor 1038. The distributing screw conveyor 1038 deposits the clean grain in a grain tank 1040. The clean grain in the grain tank 1040 can be unloaded through an unloading auger 1042 into a trailer or truck. Threshed straw separated from the grain is conducted out of the rotary threshing and separating assembly 1024 through an outlet to a discharge beater 1046. The discharge beater 1046 ejects the straw out the rear of harvester 1022.

The operation of harvester 922 is controlled from an operator's cab 1048. In the illustrated embodiment, localization input 727 (a geographic position sensor in the form of a receiver) for the reception of GPS signals (global positioning system) is attached above the operator's cab 1048. A speed sensor measuring the speed of the wheels 1014 may be provided. Mounted on one side of the clean grain elevator 1036 is a capacitor moisture sensor 1052 for measuring the moisture content of the clean grain. Such a sensor is disclosed in DE 199 34 881 A, the full disclosure of which is hereby incorporated by reference. A mass flow sensor 1054 is located at the outlet of the clean grain elevator 1036. The mass flow sensor 1054 comprises an impact plate mounted for rotation about a horizontal axis. Its deflection is dependent upon the mass flow rate of the clean grain. The deflection of the impact plate is measured and thus data on the mass flow rate of the harvested grain is provided. Such a sensor is described in EP 0 853 234 A (the full disclosure of which is hereby incorporate by reference) and the documents recited therein.

As further shown by FIG. 10, crop sensing control unit 1056 is located in the operator's cab 1048 or somewhere else on the harvester 922. Crop sensing control unit 1056 comprises each of memory 728, processor 730 and databases 800, 802 described above with respect to FIG. 9. Crop sensing control unit 1056 is in communication with localization input 727, the moisture sensor 1052, the mass flow sensor 1054, the speed sensor, when present, and sensors 626, 628. Crop sensing control unit 1056 is provided with an internal clock or receives external time signals, for example from the input 727. Crop sensing control unit 1056 records the amount of harvested grain, measured by means of the mass flow sensor 1054, and its moisture content, measured by means of the moisture sensor 1052, dependent on the geographical position of the harvester 922 (measured by means of the localization input 727, e.g., a global positioning system (GPS) or global navigation satellite system (GNSS) receiver). Crop sensing control unit 1056 additionally receives signals and/or data from sensors 626 and derives one or more crop attribute values for each of multiple distinct portions of harvesting platform 916. In one implementation, crop sensing control unit 1056 derives one or more crop attributes for individual rows or row units of harvesting platform 1016, wherein data is processed and stored on a row-by-row basis. In another implementation, crop sensing control unit 1056 derives and stores one or more crop attributes for individual plants or aggregations of individual plants. Crop sensing control unit 1056 logs the data in learned database 802 and produces a field summary which may also be stored in learned database 802 and presented on output 724. In one implementation, crop sensing control unit 1056 creates a biomass map indicating changes in biomass attributes across a field.

While the preferred embodiments of the invention have been illustrated and described, it will be appreciated that various changes can be made therein without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though it may be used in conjunction with the description of certain specific embodiments of the present invention.

What is claimed is:

1. An apparatus comprising:
    a harvester to interact with plants so as to separate a harvested portion from a biomass portion of each of the plants;
    at least one sensor carried by the harvester to output a signal that is indicative of an attribute of the biomass portion, wherein the at least one sensor is carried by a snout of a harvester header underneath the snout of the harvester header; and
    a processor following instructions contained in a memory directing the processor to determine a value the attribute of the biomass portion based upon the signal.

2. The apparatus of claim 1, wherein the attribute comprises a moisture content of the biomass portion.

3. The apparatus of claim 1, wherein the attribute comprises a quantity of the biomass portion.

4. The apparatus of claim 1, wherein the harvester comprises:
    a head partitioned into width portions, the at least one sensor to output signals for each of the width portions, the signals being based upon the attribute of the biomass portion of the plants interacted upon by each of the width portions of the head; and
    an output to record the attribute of the biomass portion of the plants for each of the width portions.

5. The apparatus of claim 1 further comprising:
    a head partitioned into width portions, the at least one sensor to output signals for each of the width portions, the signals being based upon the attribute of the biomass portion of the plants interacted upon by each of the width portions of the head;
    an output to record the attribute of the biomass portion of the plants for each of the width portions;
    a location sensor to sense a location of the harvester in a field containing the plants; and
    a controller to map the attribute of the biomass portion being gathered to regions of the field, wherein the attribute of the biomass portion mapped to regions of the field has a resolution that is a size of the width portions of the harvester.

6. The apparatus of claim 1 further comprising:
    a location identifier to identify a location of the harvester in a field containing the plants as the harvester is interacting with the plants; and
    a controller to map the attribute of the biomass portion to regions of the field.

7. The apparatus of claim 1 further comprising:
at least one sensor carried by the harvester to output a signal based upon an attribute of the harvested portion; and
a controller to identify harvested portions and biomass portions originating from same one or more plants and to store a record linking attributes of the harvested portions and attributes of the biomass portions that are identified as being from the same one or more plants.

8. The apparatus of claim 1 further comprising:
a location identifier to identify a location of the harvester in a field containing the plants as the harvester is interacting with the plants; and
a controller to identify harvested portions and biomass portions originating from same one or more plants and to store a record mapping attributes of the harvested portions and attributes of the biomass portions that are identified as being from the same one or more plants to regions of the field.

9. The apparatus of claim 1 further comprising a controller to output control signals based upon the attribute of the biomass portion, the control signals causing the harvester to change one or more operational parameters.

10. The apparatus of claim 1 further comprising a controller to output control signals based upon the attribute of the biomass portion as the harvester is crossing a field, the control signals causing the harvester to change one or more operational parameters as the harvester is crossing the field.

11. The apparatus of claim 1, wherein the at least one sensor is selected from a group of sensors consisting of: an acoustic sensor to sense noise created by interaction of the biomass portion of the plants with the harvester; and a capacitive sensor to sense dielectricity of the biomass portion of the plants with the harvester.

12. The apparatus of claim 1, wherein the signals are based upon at least one attribute of a portion of a stalk and leafage of the plant.

13. The apparatus of claim 1, wherein the at least one sensor outputs the signal in response to a first interaction of the biomass portion with the harvester header.

14. An apparatus comprising:
a harvester to interact with plants so as to separate a harvested portion from a biomass portion of each of the plants; and
at least one sensor carried by the harvester to output a signal based upon an attribute of the biomass portion, wherein the at least one sensor is carried by a harvester header, wherein the at least one sensor comprises an acoustic sensor that senses noise resulting from interaction of the biomass portion of each of the plants with the harvester head.

15. The apparatus of claim 14, wherein the acoustic sensor senses noise resulting from interaction of the biomass portion of each of the plants with a snout of the harvester header.

16. The apparatus of claim 14, wherein the acoustic sensor senses noise resulting from interaction of stalk rolls of the header with stalks.

17. The apparatus of claim 14, wherein the acoustic sensor senses noise resulting from interaction of an ear of corn hitting a stripper plate of the harvester header.

18. An apparatus comprising:
a harvester to interact with plants so as to separate a harvested portion from a biomass portion of each of the plants; and
at least one sensor carried by the harvester to output a signal based upon an attribute of the biomass portion, wherein the at least one sensor is carried by a harvester header, wherein the at least one sensor comprises a capacitive sensor on an underside of the snout.

19. The apparatus of claim 18, wherein the capacitive sensor is coated on an underside of the snout.

20. An apparatus comprising:
a harvester to interact with plants so as to separate a harvested portion from a biomass portion of each of the plants;
at least one sensor carried by the harvester to output a signal that is indicative of an attribute of the biomass portion, wherein the at least one sensor is carried by a harvester header underneath a snout of the harvester header; and
a processor following instructions contained in a memory directing the processor to determine a value the attribute of the biomass portion based upon the signal, wherein the attribute comprises a moisture content of the biomass portion.

21. An apparatus comprising:
a harvester to interact with plants so as to separate a harvested portion from a biomass portion of each of the plants;
at least one sensor carried by the harvester to output a signal that is indicative of an attribute of the biomass portion, wherein the at least one sensor is carried by a harvester header underneath a snout of the harvester header;
a processor following instructions contained in a memory directing the processor to determine a value the attribute of the biomass portion based upon the signal; and
a controller to output control signals based upon the attribute of the biomass portion, the control signals causing the harvester to change one or more operational parameters.

* * * * *